United States Patent [19]
Abe et al.

[11] Patent Number: 5,895,903
[45] Date of Patent: Apr. 20, 1999

[54] TERMINAL FOR PORTABLE IC CARD

[75] Inventors: Yuhei Abe, Hitachinaka; Atsuhiko Urushihara; Masayuki Ohki, both of Kokubunji; Shigeyuki Ito, Kawasaki, all of Japan

[73] Assignee: Hitachi, Ltd., Tokyo, Japan

[21] Appl. No.: 08/804,924

[22] Filed: Feb. 24, 1997

[30]     Foreign Application Priority Data

Feb. 28, 1996 [JP] Japan ..................... 8-041137

[51] Int. Cl.⁶ ..................... G06F 17/60; G06K 5/00
[52] U.S. Cl. ..................... 235/380; 235/379
[58] Field of Search ..................... 235/380, 379

[56]           References Cited

U.S. PATENT DOCUMENTS 5,436,436   7/1995   Matsukawa ..................... 235/380

*Primary Examiner*—Anita Pellman Gross
*Assistant Examiner*—Daniel St. Cyr
*Attorney, Agent, or Firm*—Antonelli, Terry, Stout & Kraus, LLP

[57]           ABSTRACT

An electronic wallet or terminal for a portable financial IC card having arrangements for versitle use by both visually-impaired and non-impaired persons. The electronic wallet or terminal is provided with a cabinet provided with a display, an IC card housing accommodating removable insertion of an IC card, and a privacy speaker and/or an earphone. Use of the privacy speaker or earphone accommodate visually impaired persons while affording financial confidentiality. Such terminal is programmed such that an appropriate language suited to an owner of the financial IC card or terminal is automatically determined (without user polling) from stored historical data such as a last financial transaction or personal data. The terminal is further provided with irregularities (e.g., ridges, depressions, protrusions, braille, etc) at appropriate locations on appropriate surfaces of a terminal and/or financial IC card for tactile determination via tactile feel (as opposed to visual determination) of both appropriate features and positioning of the terminal and whether or not an IC card is inserted in the terminal. The terminal also has a tapered, funnel-like guidance slot larger in dimensions than at least one of a thickness and width of an IC card, which is formed at an end of the terminal at the entrance to an IC card slot, such that the guidance slot accommodates easy/accurate insertion of the IC card into the terminal.

26 Claims, 10 Drawing Sheets

TERMINAL FOR PORTABLE IC CARD

BACKGROUND OF THE INVENTION

1. Field of the Invention

The present invention generally relates to an electronic wallet or terminal for a portable financial IC card used in a system for electronic settlement of financial transactions utilizing a financial IC card, and more specifically relates to an arrangement wherein transaction guidance is automatically provided in an appropriate language and is provided in an appropriate level of confidentiality, and wherein the terminal includes an audible output system and other features accommodating versatile use by both visually handicapped and non-handicapped persons.

2. Description of Related Art

In a so-called electronic petty settlement system arranged such that financial transactions (e.g., bill payment, retail purchases, etc.) can be settled (e.g., paid for) instantly at the time of transaction, electronic information equivalent to cash is stored in a portable card such as an IC card.

A terminal for use in such an electronic petty settlement system is disclosed in, for example, Japanese published examined patent application No. H1-55511.

Background systems are deficient in that data and instructions for an operation are only displayed on a display as visual information, and such data and instructions are either always provided in a single language, or are at least initially (i.e., at the start of each new transaction or session) provided in a default language. Accordingly, such terminal is difficult if not impossible for persons of differing languages to utilize (e.g., it may be impossible for a person having fluency in a differing language to successfully understand/complete the transaction steps). Further, such a terminal providing only visual data and instructions is difficult or impossible for a visually handicapped person or a weak-sighted person to utilize.

SUMMARY OF THE INVENTION

The present invention provides an electronic petty settlement system (e.g., terminal and financial IC card) which solves the above-mentioned problems prevalent in background systems.

More particularly, a general object of the present invention is to provide an electronic petty settlement system (e.g., electronic wallet and financial IC card) incorporating new and novel features/arrangements accommodating improved and ready/easy use by both non-handicapped and visually handicapped persons.

More specifically, an object of the present invention is to provide an electronic petty settlement system accommodating usage by visually handicapped persons by outputting, in addition to visual (display) information, audible (e.g., voice) information.

Another object of the present invention is to provide an electronic petty settlement system which outputs such audible (e.g., voice) information via a privacy speaker and/or earphones for financial privacy and safety.

An even further object of the present invention is to provide a system accommodating usage by visually handicapped persons by providing irregularities (e.g., ridges, depressions, protrusions, braille, etc) at appropriate locations on appropriate surfaces of a terminal and/or financial IC card for tactile determination via tatile feel (as opposed to visual determination) of both appropriate features and positioning of the terminal and whether or not an IC card is inserted in the terminal.

Yet as a further object, the present invention is directed to providing an electronic petty settlement system (e.g., electronic wallet and IC card) which is user friendly to provide data and guidance in an appropriate language suited to an owner of the financial IC card and/or terminal.

A more particular object of the present invention is to provide an electronic petty settlement system wherein an appropriate language suited to an owner of the financial IC card or terminal is automatically determined (without user polling) from stored historical data such as a last financial transaction or personal data.

In order to achieve the above-mentioned and other important objectives, an electronic wallet or terminal for a portable IC card according to the present invention is provided with a cabinet provided with a display, an IC card housing accommodating removable insertion of an IC card, and a privacy speaker and/or an earphone. Such terminal is programmed such that an appropriate language suited to an owner of the financial IC card or terminal is automatically determined (without user polling) from stored historical data such as a last financial transaction or personal data. The terminal is further provided with irregularities (e.g., ridges, depressions, protrusions, braille, etc) at appropriate locations on appropriate surfaces of a terminal and/or financial IC card for tactile determination via tactile feel (as opposed to visual determination) of both appropriate features and positioning of the terminal and whether or not an IC card is inserted in the terminal. The terminal also has a tapered, funnel-like guidance slot larger in dimensions than at least one of a thickness and width of an IC card, which is formed at an end of the terminal at the entrance to an IC card slot, such that the guidance slot accommodates easy/accurate insertion of the IC card into the terminal.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments at the time the patent application was filed, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following presents brief descriptions of the drawings, wherein.

DETAILED DESCRIPTION OF THE PREFERRED EMBODIMENTS OF THE INVENTION

Figure 1:
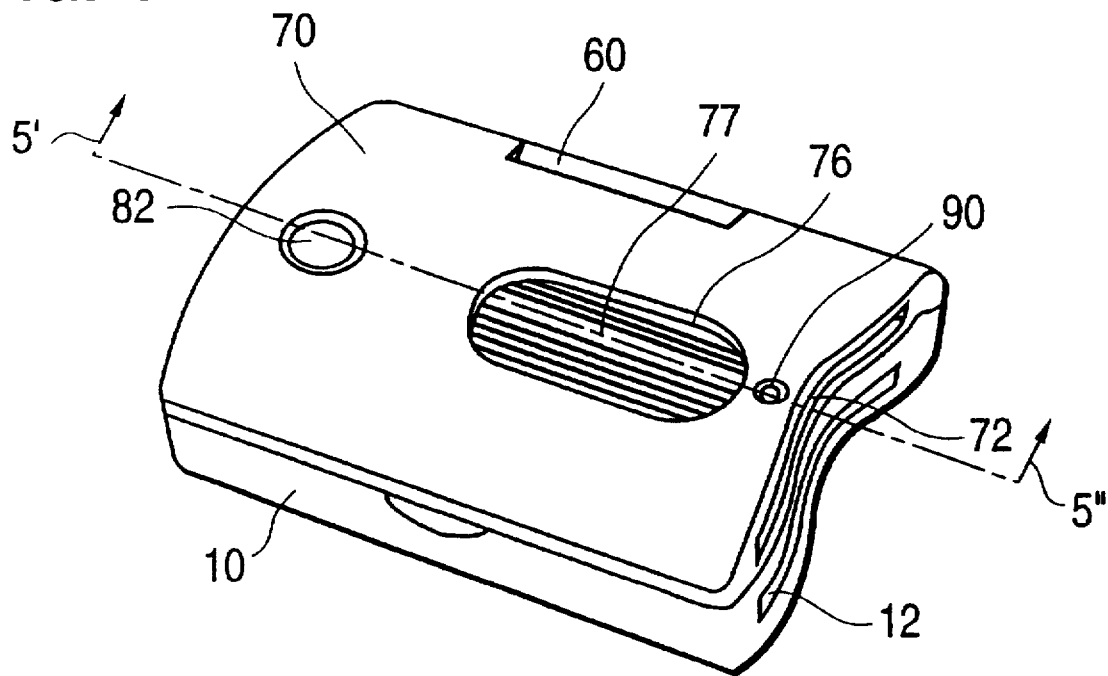
FIG. 1 is a perspective drawing showing an appearance of an electronic wallet or terminal for a portable IC card according to the present invention.

Before beginning a detailed description of the subject invention, mention of the following is in order:

When appropriate, like reference numerals and characters are used to designate identical, corresponding or similar components in differing figure drawings.

Turning now to a detailed description of a preferred embodiment of the invention, FIG. 1 is a perspective drawing showing an appearance of an electronic wallet or terminal for a portable financial IC card according to the present invention. Such terminal for a portable IC card comprises a box type body 10 and a cap member 70 which is attached to the body 10 by a hinge 60 so that the cap member can be opened or closed. The body 10 is provided with a card slot 12 on an end of the body 10 into which an IC card is removeably insertable. The cap member 70 is likewise provided with a card slot 72 on an end of the cap member into which an IC card is inserted. Such arrangement allowing two financial IC cards to be simultaneously inserted into the electronic terminal is advantageous in that financial transactions can be conducted between the cards, for example, electronic petty cash may be moved from one card to the other, such as a situation where a parent gives an electronic petty cash allowance to a child.

The cap member 70 is provided with an opening 76 having an irregular (e.g., ridged) face 77 formed at a bottom of the opening 76. During times when an IC card is not inserted into the card slot 72, the irregular face 77 can be felt with a user's finger through the opening 76 for tactile confirmation that an IC card is presently not inserted within the card slot 72. During times when the IC card is inserted into the card slot 72, a user's finger will not be able to feel the irregular face 77, but will instead feel a differing (e.g., smooth) surface of the inserted card through the opening 76. Accordingly, the arrangement of the irregular face 77 and opening 76 can be advantageously used by a visually impaired user (or even a non-impaired user) for tactile determination (as opposed to visual determination) of whether or not an IC card is presently inserted within the card slot 72. The card slot 72 is preferably arranged to accommodate an IC card fully therein without any protrusion from the terminal, and is preferably arranged to removably clamp the IC card therein. Accordingly, pushing on an inserted IC card through the opening 76 can be further advantageously used to readily slide out and remove the IC card from the card slot 72.

A balance checking button 82 is provided on the surface of the cap member 70 and when this button 82 is pressed, the balance of electronic currency recorded in an IC card can be checked by display and/or audible output as discussed ahead.

Figure 2:
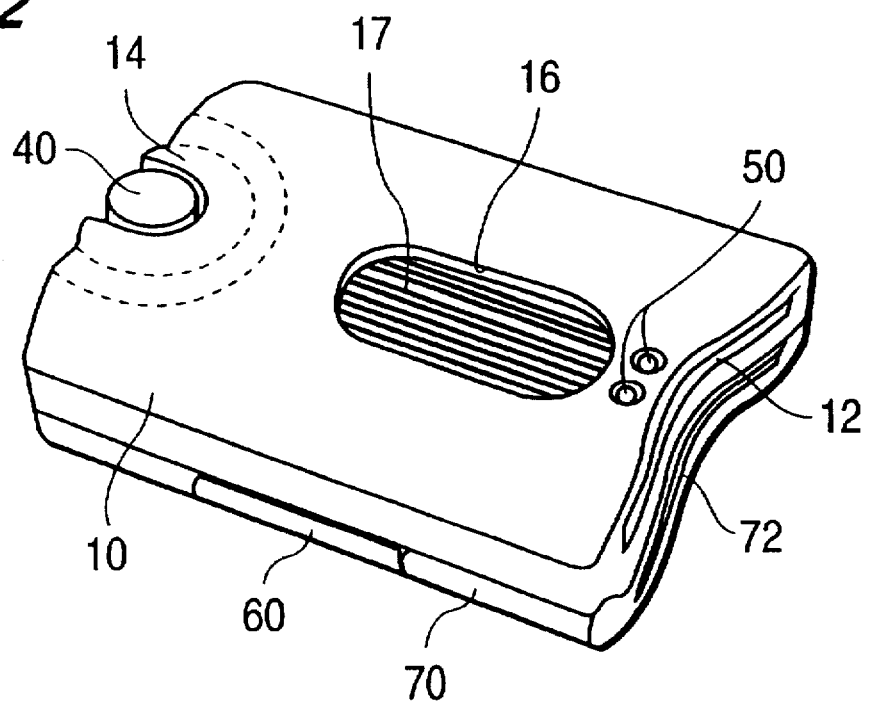
FIG. 2 is a perspective drawing showing a reverse side of the FIG. 1 terminal for a portable IC card.

FIG. 2 is a perspective drawing showing an opposite (i.e., flipped) side of the FIG. 1 terminal. More particularly, the body 10 is likewise provided with a card slot 12 on the side of the body (similar to FIG. 1's card slot 72), and with an opening 16 (similar to FIG. 1's opening 76). Like the FIG. 1 arrangement, an irregular (e.g., ridged) face 17 is formed at a bottom of the opening 16, such irregular face 17 and opening 16 arrangement also being useable (like that of FIG. 1) for user determination of whether an IC card is loaded/unloaded and for user unloading of the IC card.

In addition to the above-discussed irregular faces 17 and 77, additional irregularities are provided with respect to the portable terminal of the present invention for advantageous use by a visually impaired user (or even a non-impaired user) for tactile determination (as opposed to visual determination) of various slots, buttons, positioning arrangements, etc. More particularly, a single irregularity (e.g., depression or protrusion) 90 is also provided on the surface of the cap member 70, such single irregularity 90 being useable by a visually impaired person to confirm via tactile feel that a surface being touched is that of the cap member 70. Similarly, a dual irregularity (e.g., depressions or protrusions) 90 is also provided on the surface of the body 10 and is useable by a visually impaired person to confirm via tactile feel that a surface being touched is that of the body 10. While the above-discussed single and dual irregularities are used to distinguish the cap member 70 from the body 10, such examples of irregularities for tactile determination are non-exhaustive, i.e., other types of irregularities (e.g., braille, surface roughness, etc) can be used to distinguish any number of features of the portable terminal and/or financial IC card of the present invention.

Figure 3:
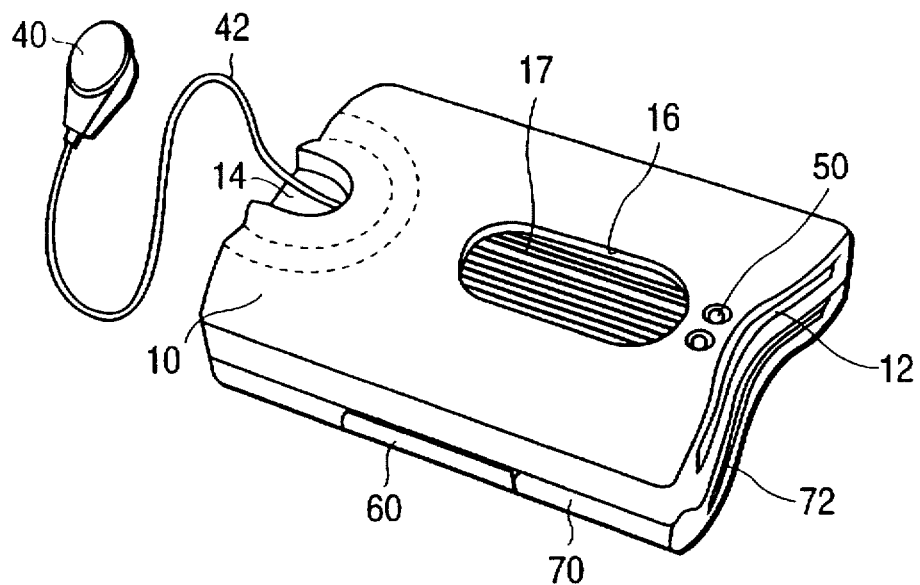
FIG. 3 shows a state in which an earphone including a speaker is pulled out from its housing in the terminal.

In continuing with a discussion of a preferred arrangement, the portable terminal of the present invention further includes an audible output system including an earphone housing 14 provided at an appropriate location on the terminal, e.g., at an end opposite to that of the entrance of the card slot 12 of the body 10. An earphone 40 including a speaker can be manually or retractably stored (via an automatic retracting mechanism) in the earphone housing, such earphone 40 being attached to the portable terminal via a cord 42. FIG. 3 shows a state in which the earphone 40 is pulled out of the earphone housing 14 of the body 10. The extracted earphone 40 can be placed in a user's ear (e.g., visually impaired user) for confidential listening to audible data and instruction output for interfacing with and operating the terminal. Such confidential listening is at least desirable in terms of financial privacy, and in fact, may be critical in terms of safety (i.e., prevents potential criminals from overhearing audible financial data and being induced to commit theft of the financial IC card). While an earphone is a preferred arrangement, other confidential arrangements are likewise applicable to the portable terminal of the present invention, e.g., the terminal may alternatively incorporate a very low volume privacy speaker (discussed ahead) with must be held closely to one's ear for confidential listening. Accordingly, as a supplement to or replacement of an information display, audible (e.g., voice) information of an electronic petty cash balance existing on a financial IC card can be obtained by inserting the card into an appropriate slot of the terminal, pressing the balance checking button 82 and listening to the earphone 40. Likewise, the portable terminal can be operated by pressing other operation buttons (discussed ahead) of the terminal and listening/responding to audible instructions from the earphone 40.

Figure 4:
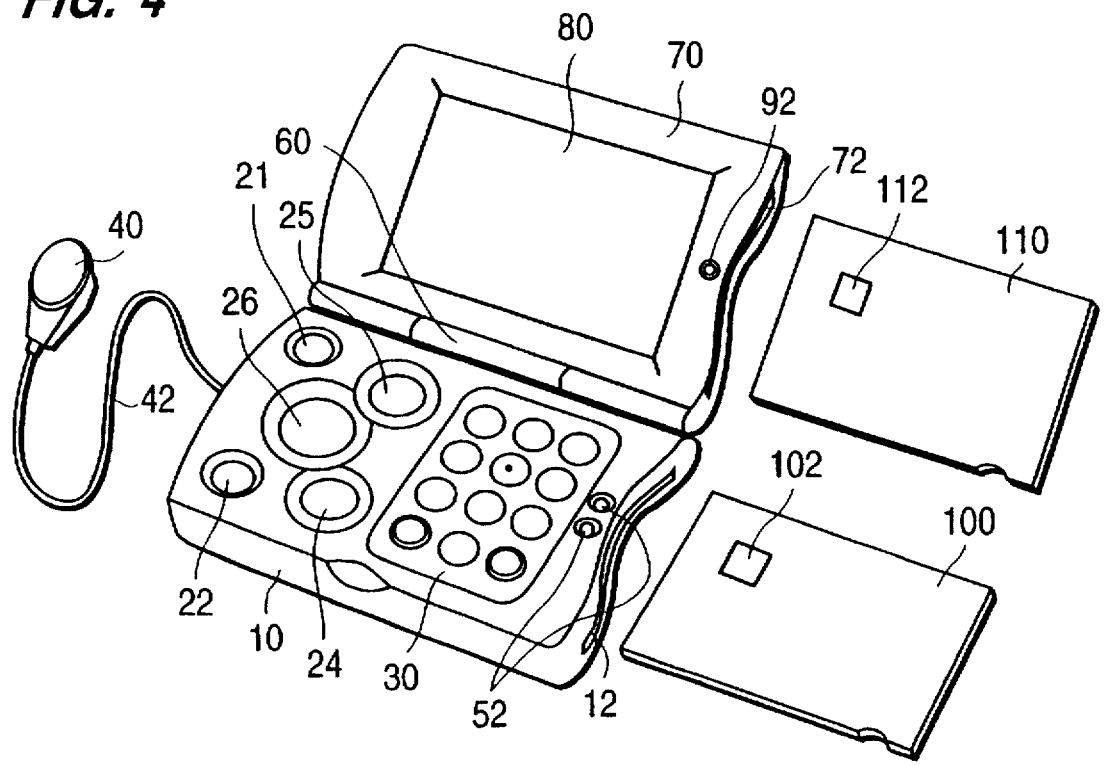
FIG. 4 is a perspective drawing showing a state in which a cap member of the terminal according to the present invention is opened apart from a body thereof.
Figure 5:
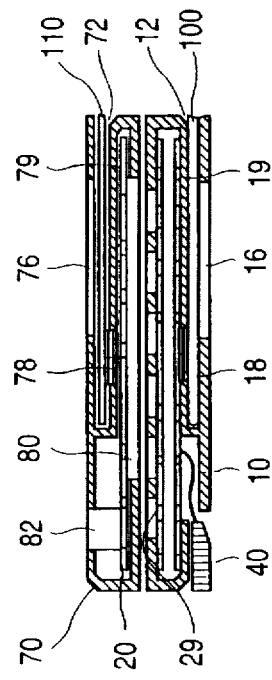
FIG. 5 is a sectional view taken along cross-sectional line 5'-5" of FIG. 1, such sectional view showing internal arrangements of the FIG. 1 terminal.

Turning now to additional features, FIG. 4 is a perspective drawing showing a state in which the cap member 70 of the terminal for a portable IC card according to the present invention is opened apart from the body 10. During normal usage, a first IC card 100 is inserted into the card slot 12 on the side of the body of the terminal and a second IC card 110 is inserted into the card slot 72 on the side of the cap member 70. IC cards 100 and 110 are respectively provided with connections (or contacts) 102 and 112 which make contact with connections (18, 78; FIG. 5) arranged in card slots 12 and 72, such that the portable terminal can communicate with the IC cards 100 and 110 via the connections 102 and 112.

A variety of groups of buttons are arranged inside the body 10. They comprise a power button 21, a repeat button 22, an affirmation button (Yes button) 24, a cancellation button (No button) 25 and a selector button 26. A key pad 30 is also preferably provided at an appropriate location. This key pad 30 is provided with the same array as, for example, that of the push buttons of a telephone set. Alternatively, the array of the key pad may be also the same as that of push buttons of a pocket calculator.

A dual irregularity 52 is formed in a vicinity of the entrance of the card slot 12 on an inside surface of the body 10. This dual irregularity 52 is similar or corresponds to the dual irregularity 50 provided on the outside surface of the body 10, such that a visually handicapped (or non-handicapped) person can confirm via tactile feel from either of the dual irregularities 50 or 52 that a face being touched is part of the body 10 of the portable terminal. Similarly, a single irregularity 92 is formed on the inside surface of the cap member 70, such that a visually handicapped (or non-handicapped) person can confirm via tactile feel from either of the single irregularities 90 or 92 that a face being touched is part of the cap member 70 of the portable terminal.

A display 80 is provided on the inside surface of the opened cap member 70. This display 80 is, for example, a liquid crystal display, and a variety of data and information can be visually displayed on it as the result of operations of the terminal. In order to accommodate use of the portable terminal of visually handicapped persons (or even non-handicapped persons) via audible output while blocking visual display (i.e., to prevent visual eavesdropping), the portable terminal of the present invention preferably includes a switch or some other type of hardware or software arrangement for selectably disabling operation of the display 80.

FIG. 5 is a sectional view taken along cross-sectional line 5'-5" of FIG. 1, such sectional view showing internal arrangements of the FIGS. 1–4 terminal. A substrate 19 provided with a connector 18 is arranged in the body 10, and when the connector 18 on the side of the substrate 19 come in contact with the connector 102 of the IC card 100 which is inserted into the card slot 12, communication between the portable terminal and the IC card 100 can be performed. Similarly, a connector 78 is arranged in the body 10, and when the connector 78 come in contact with the connector 112 of the IC card 110 which is inserted into the card slot 72, communication between the portable terminal and the IC card 100 can be performed. The connectors 18, 78, 102 and 112 can be any well known arrangement allowing communication between the terminal and the IC cards, e.g., can be electrical contacts, an optical coupling, etc. A substrate 29 is provided with any well known switches such as a button switch 20 on the back side of each of the buttons 21, 22, 24, 25 and 26, such arrangement accommodating detection of activation (i.e., pushing) of any of the buttons. Numeral 79 represents another substrate having circuit components and also contacts, wiring, etc., providing connection between the display 80 and other internal components of the portable terminal. With regard to other components illustrated in FIG. 5, like reference numerals and characters are used to designate identical, corresponding or similar components which were discussed with respect to previous Fig. drawings. Further, although not illustrated in FIG. 5, the arrangement includes other well known electronic components such as a microprocessor and a memory for storing programs and data (e.g., see FIG. 6).

Figure 6:
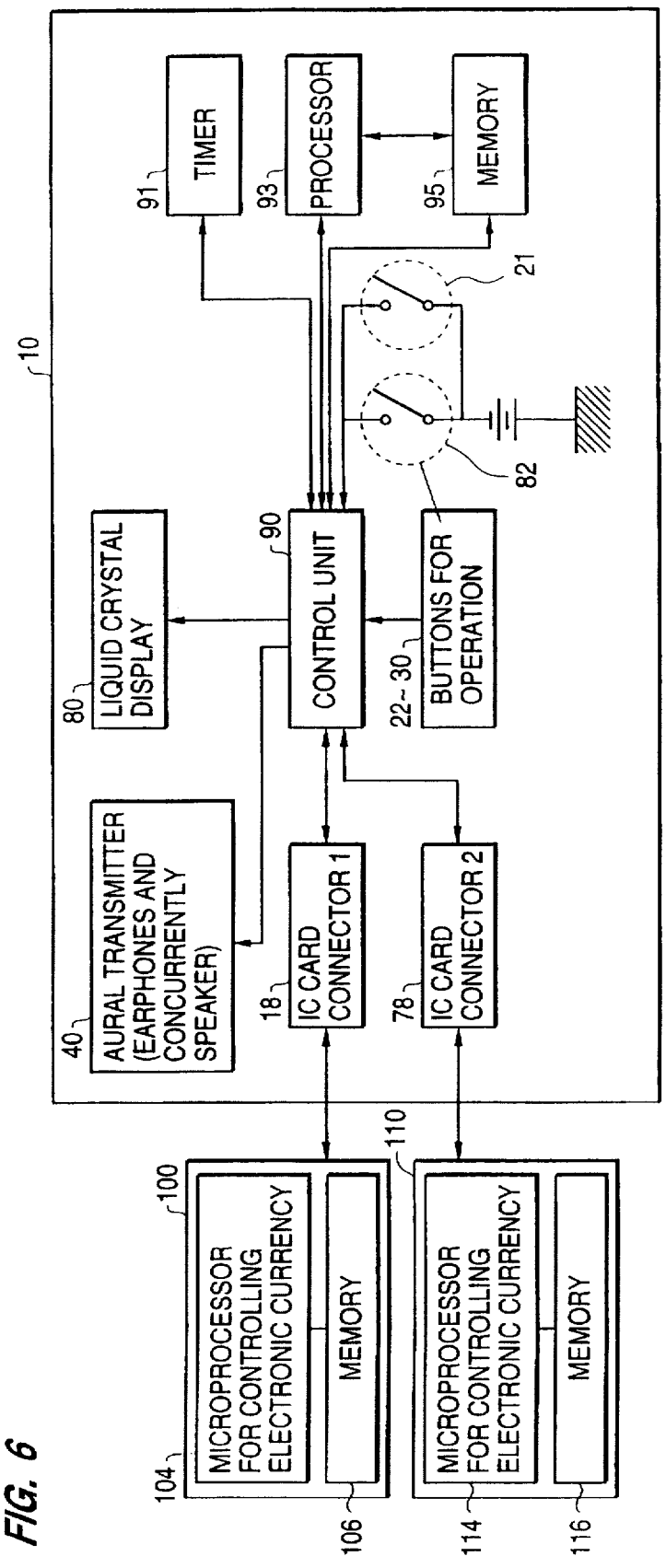
FIG. 6 is a functional block diagram showing functional blocks of the FIGS. 1-5 terminal for a portable IC card.

FIG. 6 is a functional block diagram showing functional blocks of the terminal and portable IC card of the present invention. Power activated/deactivated via the power button 21 is supplied to a control unit 90 built in the body 10. The control unit 90 further receives input from a variety of buttons, communicates with a microprocessor 104 and memory 106 of the first IC card 100 via the first IC card connector 18 and also communicates with a microprocessor 114 and memory 116 of the second IC card 110 via the second IC card connector 78. Further included are a timer 91, a processor 93 and a terminal memory 95. The control unit 90 outputs visual guidance (e.g., textual and/or graphical data and instructions) for operations to the liquid crystal display 80, and also outputs audio guidance (e.g., voiced data and instructions) via appropriate audio support circuitry (e.g., D/A converter, amplifier, etc.) to the earphone speaker 40.

Figure 7:
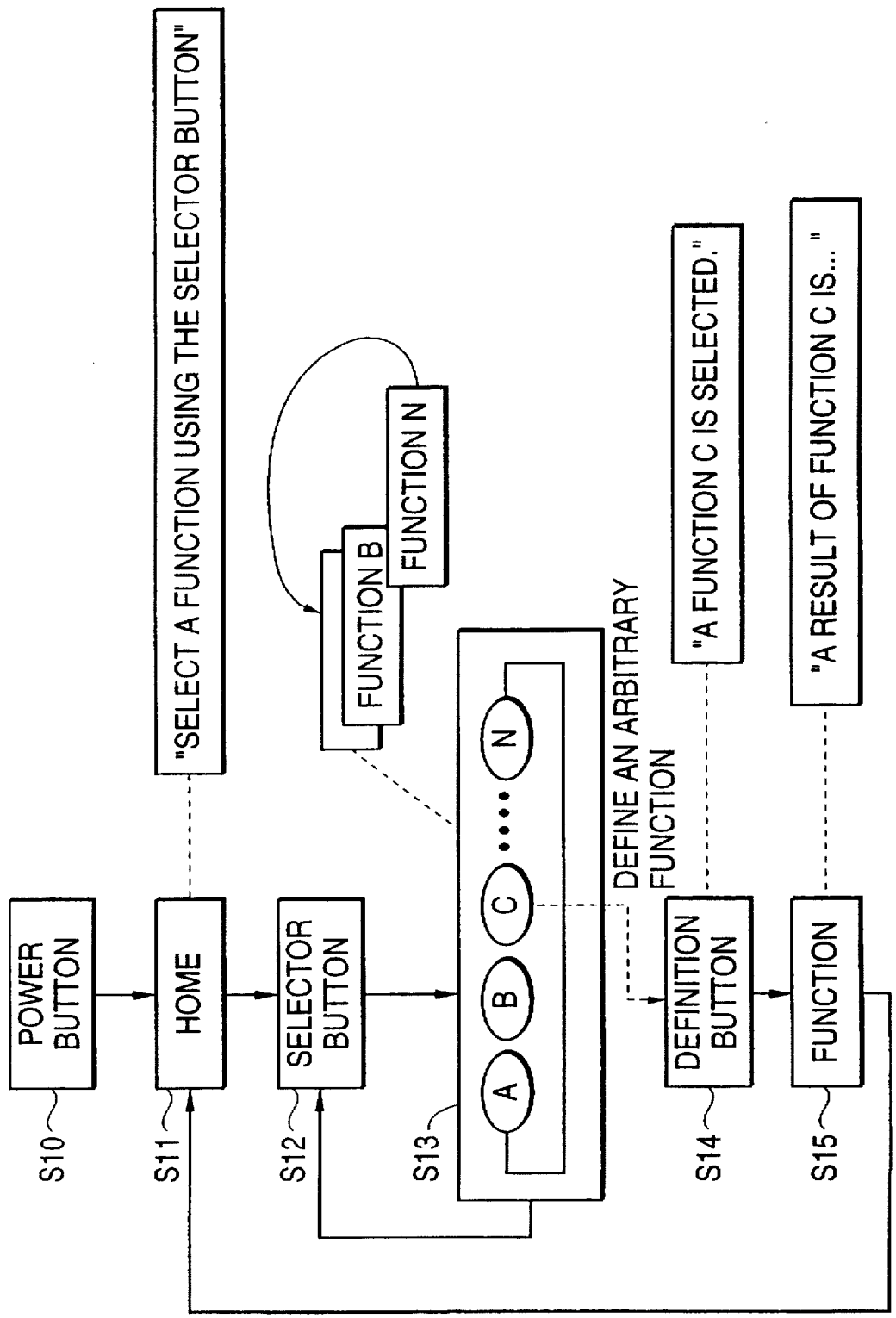
FIG. 7 is a flowchart showing exemplary audible voice guidance provided by the terminal for a portable IC card according to the present invention.

FIG. 7 is a flowchart showing examples of audible voice guidance provided by the terminal for a portable IC card according to the present invention. More particularly, in accordance with the present invention, visual guidance and audible guidance by voice are automatically provided in an appropriate language (e.g., English, Japanese, French, etc.) and/or currency (e.g., dollar, yen, franc, etc.) selected by a user or historically related to past transactions. More specifically, the terminal memory 95 (FIG. 6) stores data for providing visual and audible data and guidance in a plurality of selectable languages and currencies. The terminal memory further stores programs for both selecting an appropriate language and currency, and automatically providing guidance and currency data in the appropriate language thereafter.

Figure 18:
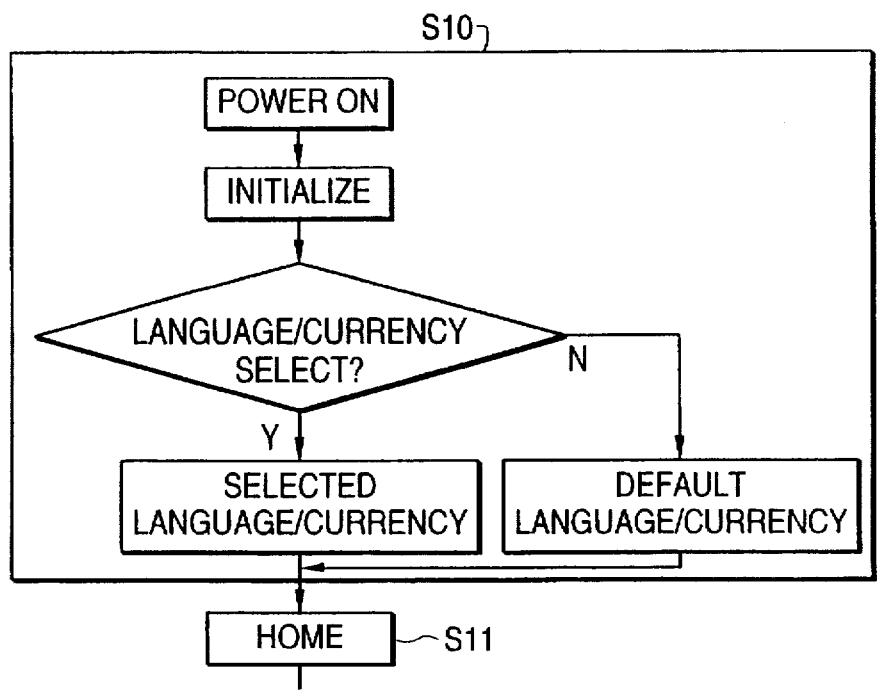
FIGS. 16–18 are flowcharts showing steps for appropriate language/currency selection for guidance provided by the terminal according to the present invention.

Turning now to the flowchart of FIG. 18 for relevant further discussion, after power on and initialization of the terminal (e.g., via the power button or insertion of an IC card), the terminal performs a subroutine which visually and/or audibly asks a user whether the user would like to select an appropriate language and/or currency. If yes, the user is allowed to select from a menu of available languages and/or currencies. If no, a default language/currency is utilized. Such subroutine allowing user selection of an appropriate language and/or currency is especially important where a user is using a new terminal or new IC card for a first time.

Figure 16:
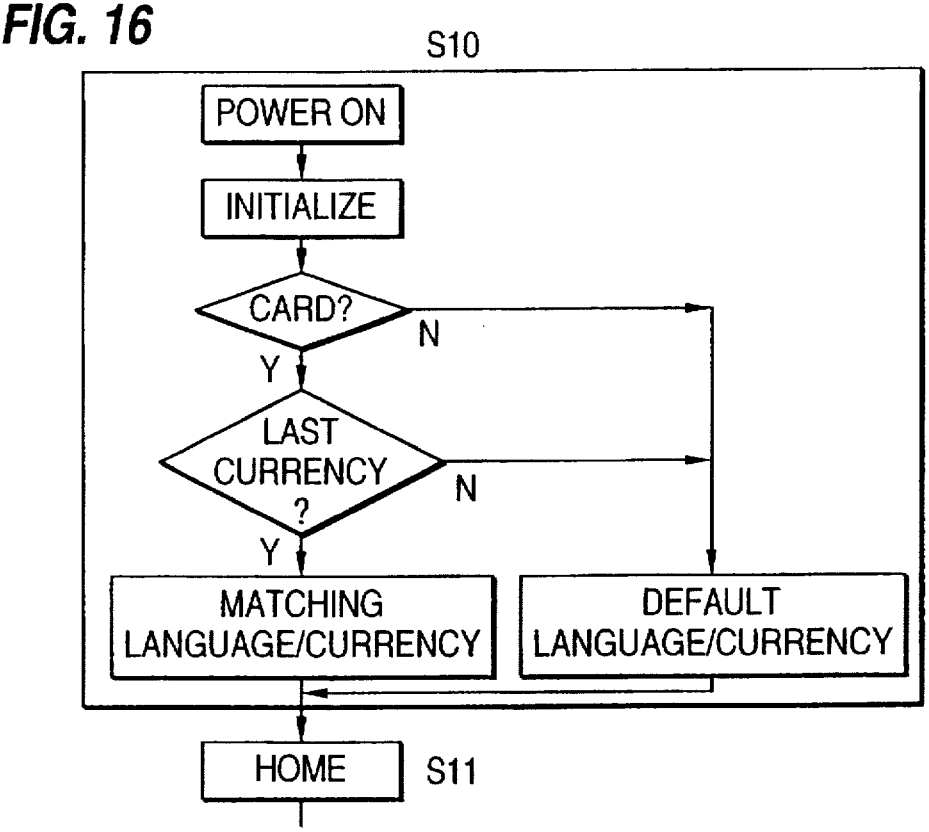
Figure 17:
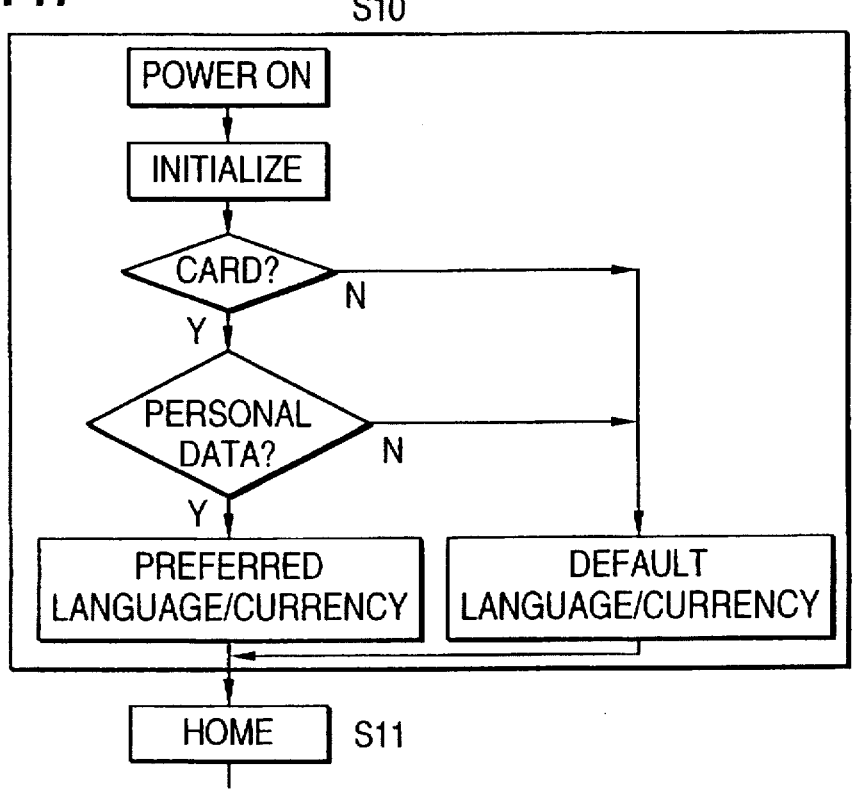

Once a user has used a terminal and an IC card, the subroutines of either of FIGS. 16 or 17 are more appropriate and preferred in an operation of the present invention. More particularly, the subroutines of FIGS. 16 or 17 automatically select and provide visual and audible data and guidance in a language and/or currency historically related to past data.

More specifically, turning first to FIG. 16, such subroutine automatically selects a language and/or currency historically related to the currency of an immediately preceding financial transaction. In order to accomplish such arrangement, a historical record of at least a last financial transaction is stored within the memory 106 or 116 of the financial IC card. After power on, initialization and confirmation that a card is inserted in the terminal, the terminal performs a subroutine which polls the inserted IC card as to the currency of a last financial transaction. If a last currency is indicated, the terminal automatically selects and utilizes a language and/or currency matching that of the last currency, for example, if yen was the currency of the last transaction, the terminal will automatically select and utilize Japanese as an appropriate language. Further, the terminal can also utilize the yen as an appropriate currency (with appropriate currency conversion from the currency presently on the IC card). If no IC card is inserted or a last currency is not indicated (e.g., as with a new IC card), a default language/currency is utilized. As an alternative to a default language/currency, the subroutine of FIG. 18 can be performed to allow a user to select an appropriate language and/or currency. Further, as an alternative to utilizing the last financial transaction stored in the financial IC card, a last financial transaction performed by the terminal itself and stored in the terminal memory 95 (FIG. 6) can be utilized.

Turning next to FIG. 17, such subroutine automatically selects a language and/or currency historically related to the currency and/or language preference of an owner of the IC card. In order to accomplish such arrangement, personal data containing at least a currency and/or language preference of the IC card owner is stored within the memory 106 or 116 of the financial IC card. After power on, initialization and confirmation that a card is inserted in the terminal, the terminal performs a subroutine which polls the inserted IC card as to personal data (i.e., a preferred language and/or currency). If personal data is indicated, the terminal automatically selects and utilizes a language and/or currency matching that indicated by the personal data, for example, if the user's personal data indicates a preference for the French language, the terminal will automatically select and utilize French as an appropriate language. If the user's personal data indicates a preference for the franc, is such preferred currency is different from a currency type presently stored on the card, appropriate currency conversion must be conducted or dual currencies must be indicated in parallel. If no IC card is inserted or personal data is not indicated (e.g., as with a new IC card), a default language/currency is utilized. As an alternative to a default language/currency, the subroutine of FIG. 18 can be performed to allow a user to select an appropriate language and/or currency, and such selection can be stored onto the IC card as personal data. Further, as an alternative to utilizing personal data stored in the financial IC card, personal data stored in the terminal memory 95 (FIG. 6) and related to an owner of the terminal can be utilized.

The subroutines of FIGS. 16 and 17 are advantageous in that the terminal automatically selects an appropriate language and/or currency historically related to past data, thus avoiding the monotony of repeated language/currency selection by a user and thus speeding up a transaction performed by the terminal.

Returning now to the example illustrated in FIG. 7, English language is utilized as an exemplary user appropriate language. When the power button 21 is pressed in a step S10 (or an IC card is inserted), visible guidance according to such language is displayed on the display 80 in a step S11 and audible guidance such as "Select a function using the selector button" is also outputted in the form of voiced language from the earphone 40. Next, each time the selector button 26 is sequentially pressed in a step S12, the terminal sequences to a next function in a menu sequence of functions A, B, C, ... N, and then audible (e.g., voiced) guidance such as "Function A", "Function B", .... "Function N" indicating a presently selected function A to N is output to the earphone 40 in a step S13. When a desired function (e.g., function C) is finally selected, and the definition (or affirmation) button 24 is pressed in a step S14 to activate such function, audible guidance such as "A function C is selected." is outputted in voice using the earphone 40. Such activated function C is then executed in a step S15 and appropriate audible guidance such as "A result of function C is ... " is output to the earphone 40.

Accordingly, it can be seen that in addition to simply obtaining audible information of an electronic cash balance existing in a financial IC card, the audible output system of the present invention can further be used by a visually handicapped person (and even a non-handicapped person) to accomplish complex functions with the terminal. More particularly, audible (e.g., voiced) guidance can be provided during many different modes of the terminal, for example, audible guidance can be provided upon each initialization of the terminal as initiated by a pushing of the power button or the insertion of a financial IC card. Further, audible guidance can be output corresponding to selections required by a function being performed, upon user operation of any of the definition button 24, the cancellation button 25 or any in the ten key pad 30 according to the guidance. When the repeat button 22 is pressed, the audible guidance by voice is again outputted. Such repeat arrangement is important in situations where the audible output is not clearly heard (e.g., noisy environments) or is not clearly understood.

Figure 8:
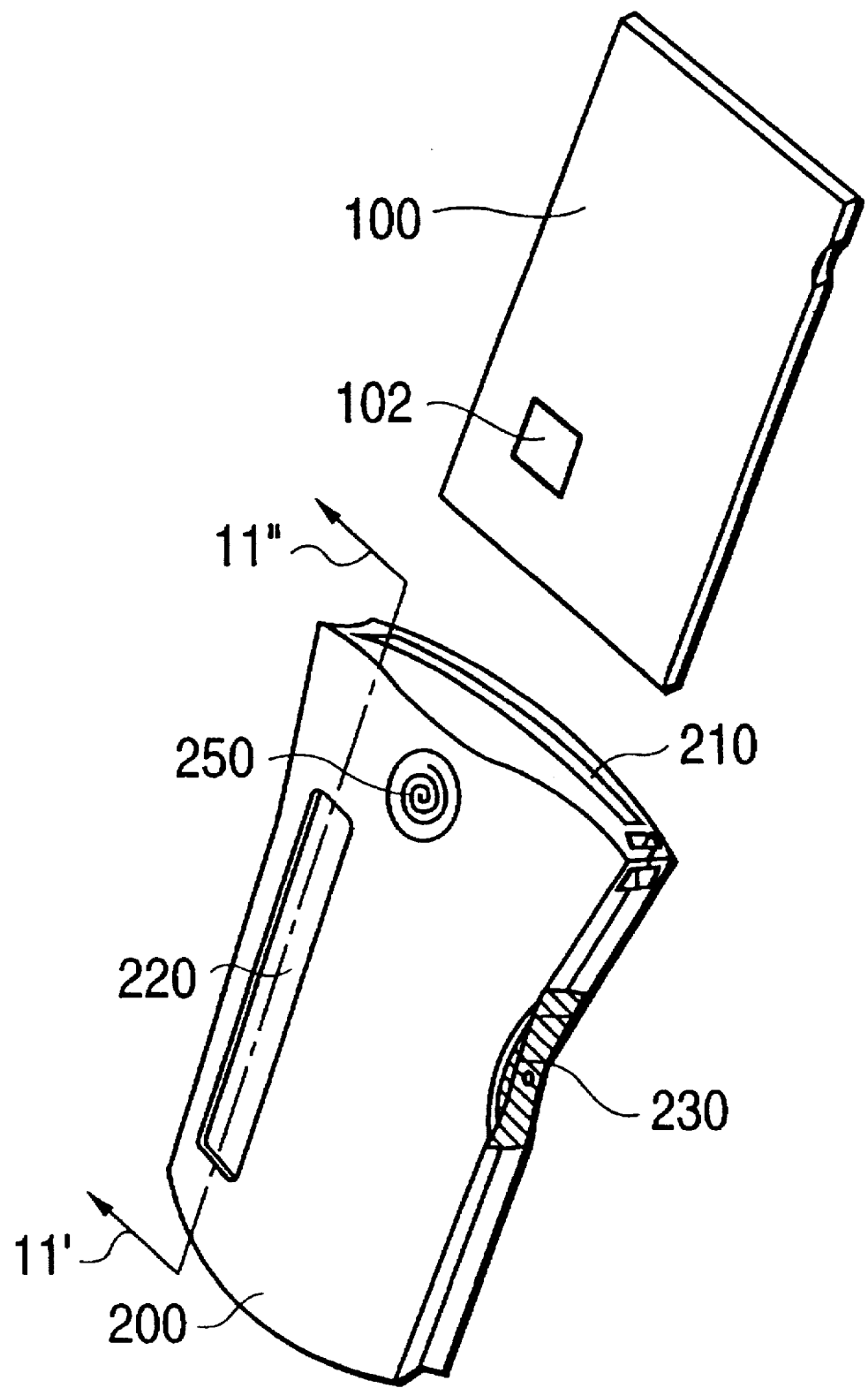
FIGS. 8–9 are perspective views showing terminals for a portable IC card according to additional embodiments of the present invention.
Figure 9:
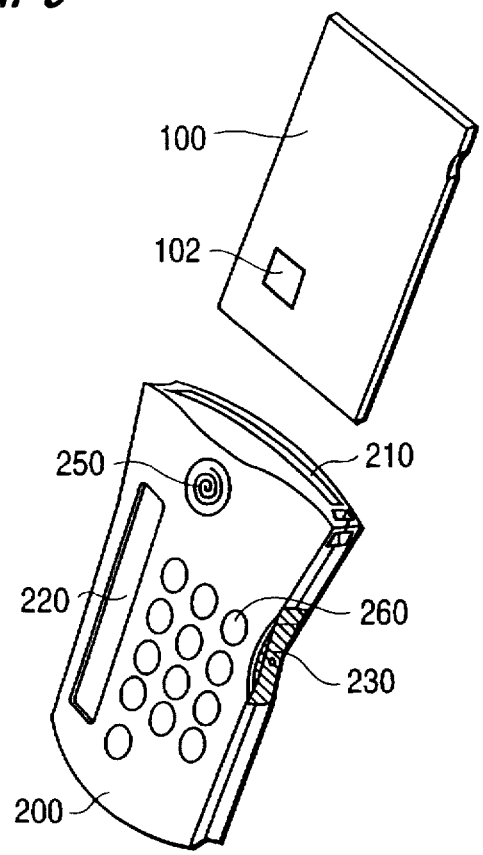
Figure 10:
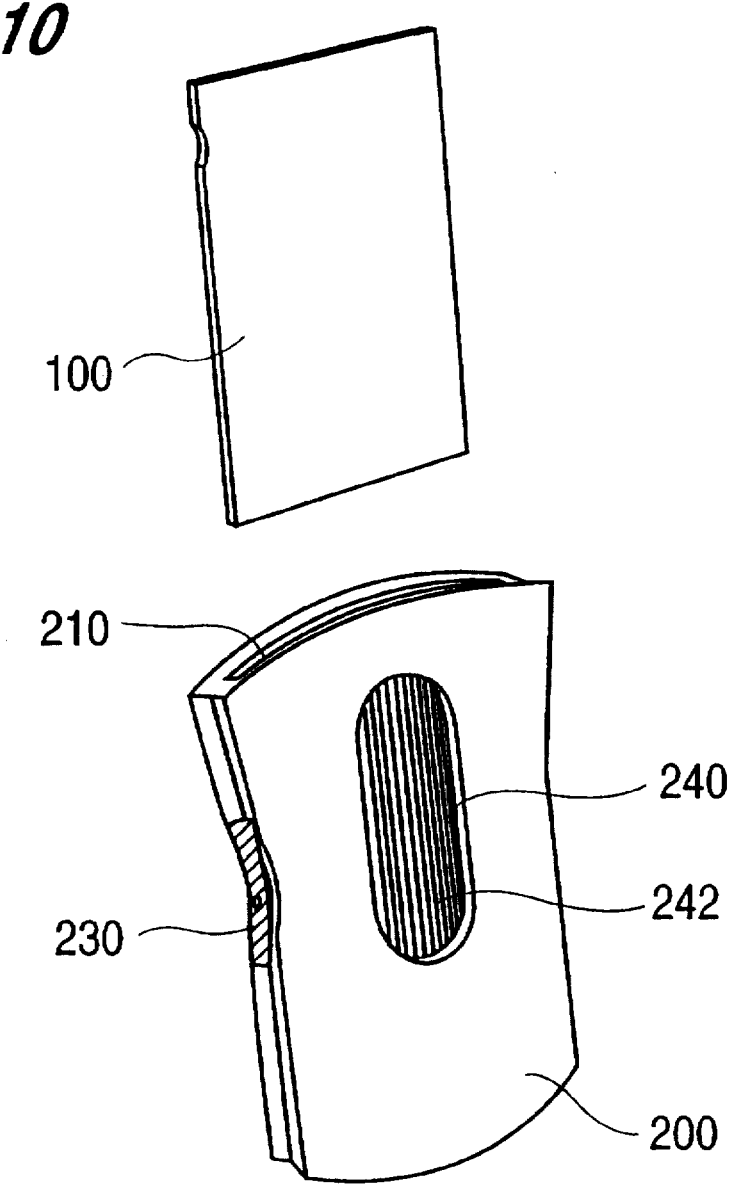
FIG. 10 is a perspective view showing a backside of either of the FIGS. 8–9 terminals.

FIGS. 8 and 9 are perspective drawings showing electronic wallets or terminals for a portable IC card according to other embodiments of the present invention, and FIG. 10 is a perspective drawing showing a back side of such terminals. Such terminals have a card holder type body 200 provided with a card slot 210 into which the IC card 100 is inserted. A display 220 is provided on a surface of the body 200, and is, for example a liquid crystal display. A speaker 250 is arranged in the vicinity of the entrance of the card slot 210 near to this display 220. To afford safety and financial confidentiality, the speaker 250 is preferably a miniature privacy speaker outputting only a very low volume such that the speaker must be held closely to a user's ear in order to be heard. The terminal may be keyless as shown in FIG. 8, or alternatively, a key pad 260 may be arranged on the body 200 as shown in FIG. 9. An opening 240 which communicates with the card slot 210 is provided on the back side of the body 200 as shown in FIG. 10. Irregularities 242 are formed on the face (i.e., bottom) of the card slot 210 inside the opening 240 so as to accommodate user tactile checking of whether an IC card exists in the card slot 210 by inserting a user's finger through the opening 240. Further, the opening 240 can be used by a user to push an inserted card out of the card slot 210. A balance checking button 230 is provided on a side of the body 200. When this balance checking button 230 is pressed, the balance of electronic currency which is recorded in the IC card 100 is visually displayed on the display 220 and is also audibly outputted from the speaker 250 as a voiced output.

Figure 11:
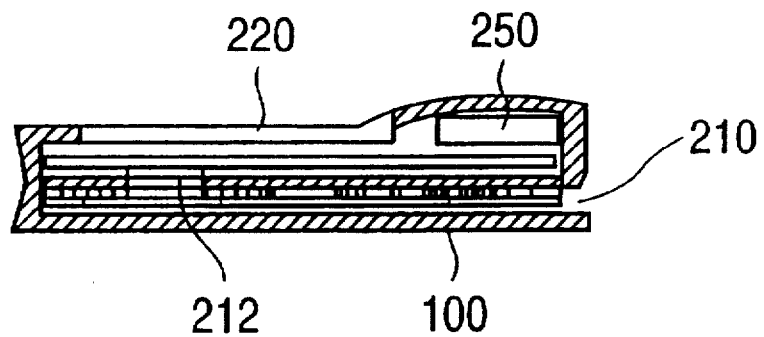
FIG. 11 is a sectional view taken along cross-sectional line 11'–11" of FIG. 8, such sectional view showing internal arrangements of the FIG. 8 terminal.

FIG. 11 is a sectional view taken along cross-sectional line 11'-11" of FIG. 8, such sectional view showing internal arrangements of the FIG. 8 terminal. More particularly, the IC card 100 which is inserted into the slot 210 is connected to a microcomputer in the body via IC connector 212.

Figure 12:
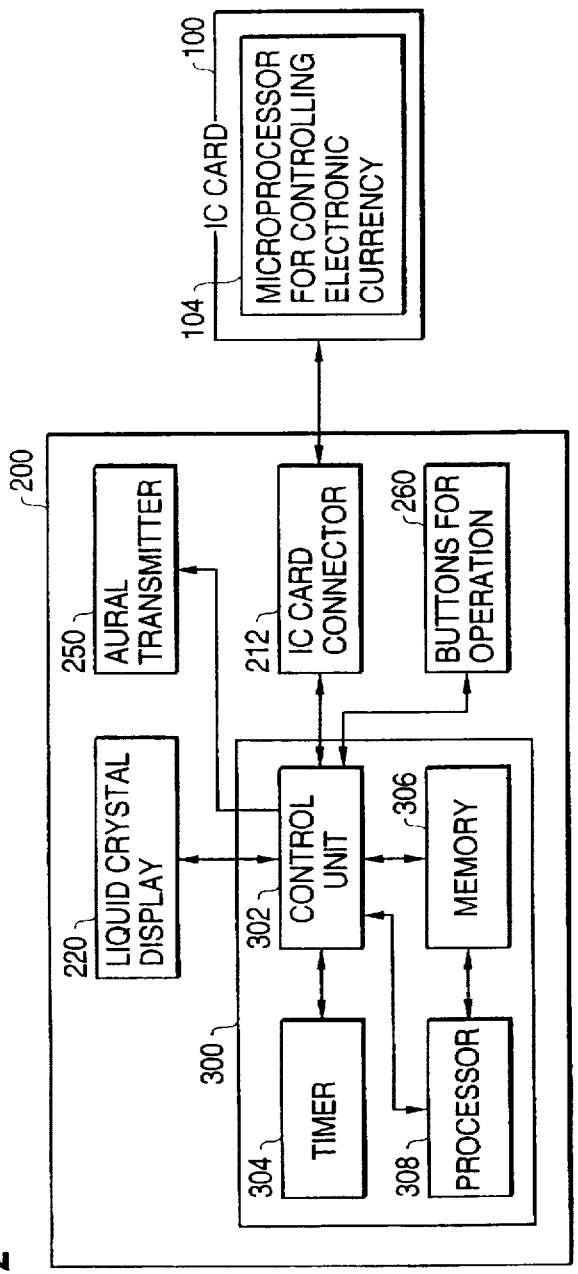
FIG. 12 is a functional block diagram showing functional blocks of the terminal for a portable IC card of FIGS. 8–11.

FIG. 12 is a functional block diagram showing functional blocks of the terminal for a portable IC card of FIGS. 8–11. A microcomputer 300 built in the body 200 is provided with a control unit 302, a timer 304, memory 306 and a processor 308. The control unit 302 communicates with a microprocessor 104 of the IC card 100 via the IC contacts 212. Utilizing such arrangement, data such as the electronic currency balance existing within the IC card is displayed on the liquid crystal display 220 and is also outputted from the speaker 250 as voice. Further, the functions discussed previously with respect to other embodiments of the present invention can also be incorporated.

Figure 13:
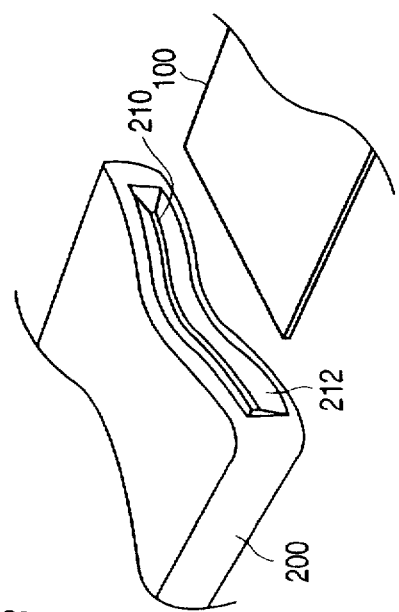
FIGS. 13 to 15 show further construction details concerning the arrangement of the entrance of a card slot for the terminal of the present invention.
Figure 14:
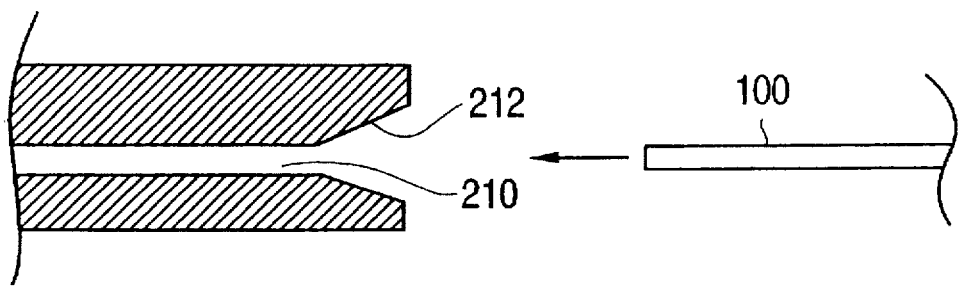
Figure 15:
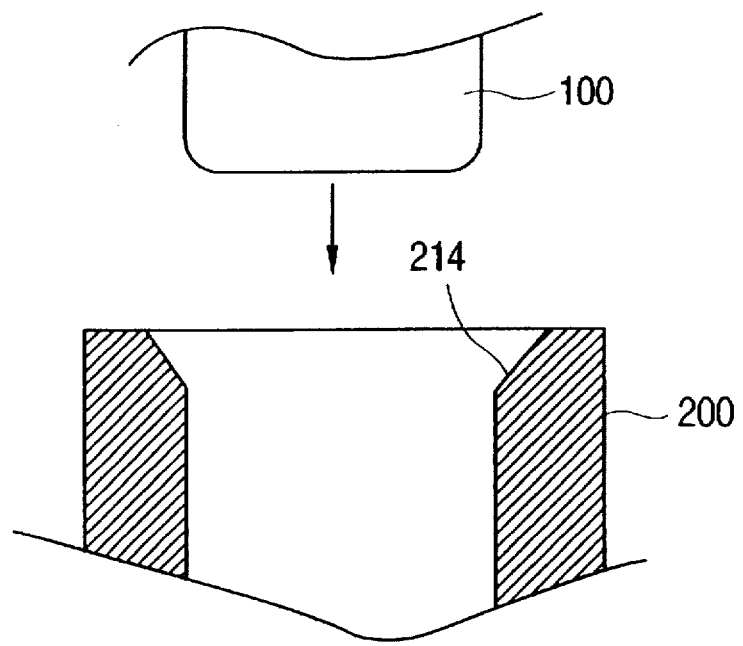

FIGS. 13 to 15 show further construction details concerning the arrangement of the entrance of the card slot 210 provided in the body 200. More particularly, portions 212 and 214 at such entrance are tapered so that the IC card 100 can be readily and easily inserted into the slot 210. More specifically, the terminal also has a tapered, funnel-like guidance slot larger in dimensions than at least one of a thickness and width of an IC card, which is formed at an end of the terminal at the entrance to an IC card slot, such that the guidance slot accommodates easy/accurate insertion of the IC card into the terminal. Owing to such tapered, funnel-like construction, a visually handicapped person or any other person can readily insert an IC card into the terminal.

As described above, according to the present invention, data and instructions for an operation are displayed on a liquid crystal display of a terminal, and the terminal further includes additional features accommodating use by visually handicapped persons. More particularly, irregularities such as ridges, depressions and protrusions are provided at appropriate locations on the terminal to allow a visually handicapped person to determine appropriate features and positioning of the terminal via tactile feel. Further, the terminal of the present invention includes an audible output system providing audible guidance.

Accordingly, even a weak-sighted person and a visually handicapped person can operate such terminal readily and precisely.

While we have shown and described several embodiments in accordance with the present invention, it is understood that the same is not limited thereto but is susceptible of numerous changes and modifications as known to those skilled in the art, and therefore the present invention should not be limited to the details shown and described herein but is intended to cover all such changes and modifications as are encompassed by the scope of the appended claims.

What is claimed is:

1. A terminal for a portable financial integrated circuit (IC) card, comprising:

a cabinet into which said portable financial IC card is removably insertable;

a user interface which enables obtaining of guidance output from said terminal;

a memory storing data including language data for providing said guidance output according to a plurality of different languages; and a selector which detects historical transaction data pertaining to a currency of a last financial transaction from at least one of said memory and said portable financial IC card, and which uses a detected historical transaction data to automatically select a language from said plurality of different languages as a language for said guidance output.

2. A terminal as claimed in claim 1, wherein said user interface is one of an earphone and a privacy speaker, and wherein said guidance output is voiced guidance from said speaker.

3. A terminal as claimed in claim 2, wherein said user interface further includes a visual display selectable to display or not to display, wherein said guidance output can be selectably output as at least one of textual and graphical guidance on said display to complement said voiced guidance.

4. A terminal as claimed in claim 1, wherein said user interface is a visual display, and wherein said guidance is output as at least one of textual and graphical guidance on said display.

5. A terminal as claimed in claim 1, further comprising irregularities at predetermined locations on said terminal for use in tactile determination via tactile feel of at least one of appropriate features/positioning of said terminal and whether or not said portable financial IC card is inserted in said cabinet.

6. A terminal as claimed in claim 5, wherein said irregularities are at least one of ridges, depressions, protrusions and braille.

7. A terminal as claimed in claim 1, further comprising a tapered, funnel-like guidance slot at least partially larger in dimensions than at least one of a thickness and width of said portable financial IC card, wherein said guidance slot is formed at an end of said housing at an entrance to an IC card slot, such that said guidance slot accommodates easy/accurate insertion of said portable financial IC card into said housing.

8. A terminal as claimed in claim 1, wherein said terminal is more specifically an electronic wallet.

9. A terminal for a portable financial integrated circuit (IC) card, comprising:

a cabinet into which said portable financial IC card is removably insertable;

a user interface which enables obtaining of guidance output from said terminal;

a memory storing data including language data for providing said guidance output according to a plurality of different languages;

a selector which detects historical data from at least one of said memory and said portable financial IC card, and which uses a detected historical data to automatically select a language from said plurality of different languages as a language for said guidance output; and irregularities at predetermined locations on said terminal for use in tactile determination via tactile feel of at least one of appropriate features/positioning of said terminal and whether or not said portable financial IC card is inserted in said cabinet.

10. A terminal as claimed in claim 9, wherein said user interface is one of an earphone and a privacy speaker, and wherein said guidance output is voiced guidance from said speaker.

11. A terminal as claimed in claim 10, wherein said user interface further includes a visual display selectable to display or not to display, wherein said guidance output can be selectably output as at least one of textual and graphical guidance on said display to complement said voiced guidance.

12. A terminal as claimed in claim 9, wherein said user interface is a visual display, and wherein said guidance is output as at least one of textual and graphical guidance on said display.

13. A terminal as claimed in claim 12, wherein said irregularities are at least one of ridges, depressions, protrusions and braille.

14. A terminal as claimed in claim 9, further comprising a tapered, funnel-like guidance slot at least partially larger in dimensions than at least one of a thickness and width of said portable financial IC card, wherein said guidance slot is formed at an end of said housing at an entrance to an IC card slot, such that said guidance slot accommodates easy/accurate insertion of said portable financial IC card into said housing.

15. A terminal as claimed in claim 9, wherein said terminal is more specifically an electronic wallet.

16. A terminal as claimed in claim 9, wherein said selector more specifically detects user personal data from at lest one of said portable financial IC card and said terminal, and automatically selects a language designated by a detected said user personal data as a language for said guidance output.

17. A terminal as claimed in claim 9, wherein said selector more specifically detects transaction data pertaining to a currency of a last financial transaction from at least one of said portable financial IC card and said terminal, and automatically selects a language corresponding to said currency as a language for said guidance output.

18. A terminal for a portable financial integrated circuit (IC) card, comprising:

a cabinet into which said portable financial IC card is removably insertable;

a user interface which enables obtaining of guidance output from said terminal;

a memory storing data including language data for providing said guidance output according to a plurality of different languages;

a selector which detects historical data from at least one of said memory and said portable financial IC card, and which uses a detected historical data to automatically select a language from said plurality of different languages as a language for said guidance outputs; and a tapered, funnel-like guidance slot at least partially larger in dimensions than at least one of a thickness and width of said portable financial IC card, wherein said guidance slot is formed at an end of said housing at an entrance to an IC card slot, such that said guidance slot accommodates easy/accurate insertion of said portable financial IC card into said housing.

19. A terminal as claimed in claim 18, wherein said user interface is one of an earphone and a privacy speaker, and wherein said guidance output is voiced guidance from said speaker.

20. A terminal as claimed in claim 19, wherein said user interface further includes a visual display selectable to display or not to display, wherein said guidance output can be selectably output as at least one of textual and graphical guidance on said display to complement said voiced guidance.

21. A terminal as claimed in claim 18, wherein said user interface is a visual display, and wherein said guidance is output as at least one of textual and graphical guidance on said display.

22. A terminal as claimed in claim 18, further comprising irregularities at predetermined locations on said terminal for use in tactile determination via tactile feel of at least one of appropriate features/positioning of said terminal and whether or not said portable financial IC card is inserted in said cabinet.

23. A terminal as claimed in claim 22, wherein said irregularities are at least one of ridges, depressions, protrusions and braille.

24. A terminal as claimed in claim 18, wherein said terminal is more specifically an electronic wallet.

25. A terminal as claimed in claim 18, wherein said selector more specifically detects user personal data from at least one of said portable financial IC card and said terminal, and automatically selects a language designated by a detected said user personal data as a language for said guidance output.

26. A terminal as claimed in claim 18, wherein said selector more specifically detects transaction data pertaining to a currency of a last financial transaction from at least one of said portable financial IC card and said terminal, and automatically selects a language corresponding to said currency as a language for said guidance output.

* * * * *